Patented Feb. 13, 1951

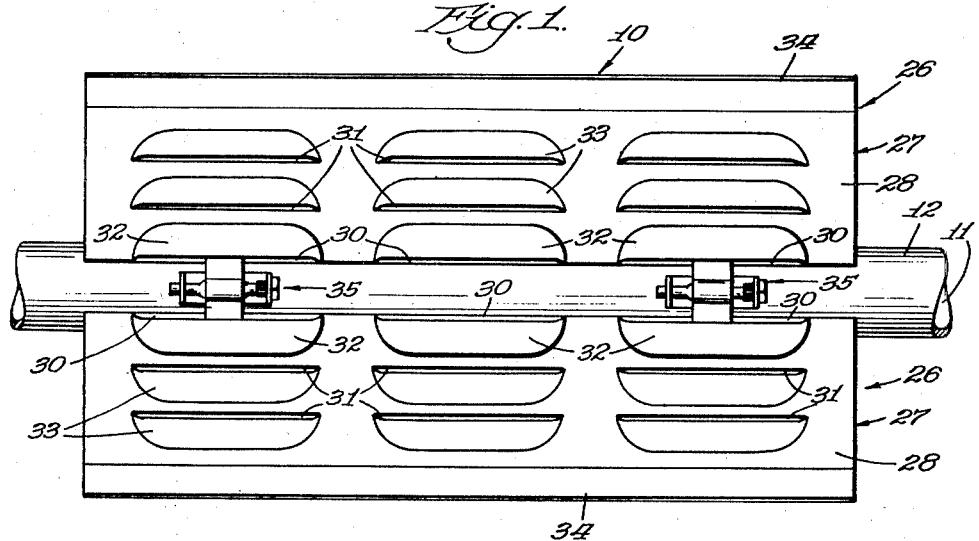
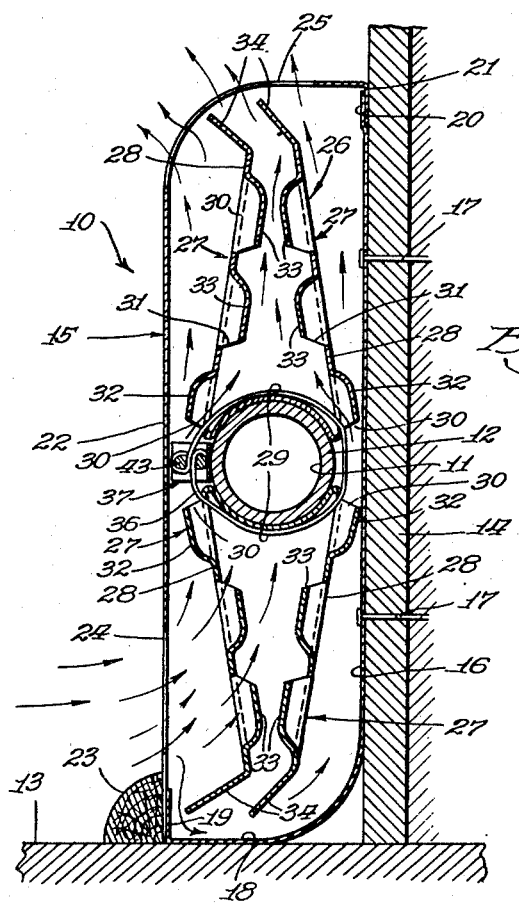
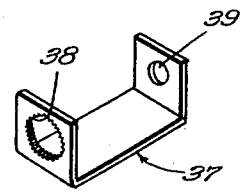
INVENTOR.
Le Roy N. Hermann

2,541,162

UNITED STATES PATENT OFFICE 2,541,162

HEAT-RADIATING DEVICE

Le Roy N. Hermann, Chicago, Ill.

Application July 29, 1948, Serial No. 41,202

8 Claims. (Cl. 257—133)

This invention relates to a heat radiating device and more particularly to a convection type radiating unit enclosed within the baseboard of a room.

The ordinary means of heating buildings generally comprises unsightly heat exchangers or radiators which conduct a heated fluid. This means of heating has generally been found unsatisfactory since the bulk and appearance of the radiators preclude the utilization of the room to its best advantages. In order to overcome these serious disadvantages heat radiators have been designed which are completely hidden from view and are so positioned that the space of the room may be utilized to a maximum efficiency. One of the better constructions of a heat radiator of this kind is the baseboard type of radiator.

In the baseboard type of radiator, a conduit for conducting or circulating a heated fluid, such as water or steam, is generally supported adjacent to the wall of the room by means of fixed brackets or other supporting members. A baseboard enclosure is positioned adjacent to the wall and encloses the conduit. The enclosure is provided with air inlet and outlet openings for permitting convection currents to circulate about the conduit thereby providing for the exchange of heat to the air. In general it is found that the surface area of the conduit alone is insufficient to provide for proper radiation and in order to provide for maximum efficiency in the transfer of heat, it is desirable that additional heat transfer members be provided.

It is therefore a general object of the present invention to provide an improved baseboard type radiator construction which is inexpensive to manufacture and which can be set up and assembled with a minimum of time and labor.

The invention has for another important object the provision of an improved convection type heat radiating device having heat transfer members adapted to be quickly connected to a conduit extending within a baseboard enclosure.

Still another object is to provide a pair of heat transfer members adapted to be connected to a conduit extending within a baseboard enclosure, said heat transfer members including diathermic fins having air inlet and air outlet louvers, and securing means for connecting said fins in heat transfer relation to the conduit.

A further important object of this invention is the provision of improved heat transfer members, said heat transfer members including vertical, transversely spaced fins constructed of a metal having a high thermal co-efficiency, said fins extending substantially parallel with respect to a vertical plane through a conduit, and means for connecting the heat transfer members to opposite sides of the conduit in substantially vertically aligned relation, whereby the thermal efficiency and thermo radiation of the conduit is increased to a desired maximum.

A still further object is the provision of an improved construction in a heat transfer member of a type which may be readily installed for cooperation with a conduit for circulating a heated fluid, said heat transfer members including diathermic fins having air louvers extending in the direction of the conduit and being effective to circulate convection currents throughout the heat transfer members.

The foregoing and other desirable objects and advantages of the invention will be readily apparent from the following detailed description of the invention as shown in the accompanying sheet of drawing in which:

Figure 1 is a side elevational view showing a portion of a radiating device having a pair of heat transfer members connected to a horizontally extending conduit.

Figure 2 is a cross-sectional view through the radiating device, said view showing its relation to a baseboard enclosure connected to the lower wall structure of a room.

Figure 3 is a detail view in perspective of an attaching or securing clip.

Figure 4 is a detail view in perspective of a locking pin used in cooperation with a securing clip.

Although reference will be made herein to the heat transfer members as particularly adaptable to a convection type baseboard radiator, it should be understood that the principles of the invention are applicable to other types of radiating devices or heating units. Therefore, the present disclosure should be taken as illustrative and not limiting.

Referring particularly to Figures 1 and 2 of the drawing, a convection radiator of the baseboard type is generally designated by the numeral 10. The radiator 10 includes a conduit 11 having an outer cylindrical surface 12. The conduit 11 is generally made of a metal having a high thermal conductivity. The conduit 11 is positioned above the floor 13 of a room or building, and lies adjacent to a wall structure 14. The conduit 11 generally extends horizontally in this manner throughout a room or building and is in communication with a heating unit (not shown) which directs a heated fluid, such as steam or water, for circulation therethrough.

A vertically extending baseboard enclosure is generally designated by the numeral 15. The enclosure 15 includes a metal backing sheet 16 which is connected to the wall 14 by means of screws or other fastening members 17. The backing sheet 16 has a portion 18 extending parallel to the floor 13 and is provided with a turned up end 19. The upper end of the backing sheet 16 is joggled outwardly, as indicated at 20, for receiving the turned down end 21 of a cover plate 22. The cover plate 22 has a sliding connection at its lower end between the turned up end 19 and a moulding designated at 23.

The cover plate 22, as shown in Figure 2, is provided with a lower air inlet opening 24, and at its upper end with a heated air outlet opening 25. Figure 2 shows primarily the two openings 24 and 25, but in practice the plate 22 is provided with a plurality of these openings extending in the direction of the conduit 11, in horizontally spaced relation.

Figures 1 and 2 show a pair of heat transfer members, generally designated by the numeral 26, connected about the outer surface 12 of the conduit 11. Each heat transfer member includes a pair of heat radiating fins 27. The fins 27 are made from a material having relatively high thermal conductivity such as aluminum, copper, etc. Each fin 27 includes a substantially vertical wall 28 extending in the direction of the conduit 11. Stated more concisely the fins 27 extend generally in a direction parallel to a vertical plane through said conduit.

The paired fins 27 are transversely spaced and are connected by a wall or base member 29. The wall or base member 29 is as shown in Figure 2, integral with the fins 27, and is of arcuate shape embracing the cylindrical surface 12 of the conduit 11, in heat transfer relation.

Each wall 28 is provided with a plurality of horizontally extending air openings or apertures 30, and air openings or apertures 31 through which convection currents of air are free to pass. The apertures 30 extend horizontally adjacent to the wall 28 of the heat transfer members 26. The openings 31 consist of two rows which extend horizontally and substantially parallel to the openings 29. Outwardly pressed louver members 32 and inwardly pressed louver members 33, respectively, act as deflectors for the openings 30 and 31. Each fin 27 is provided at its end with a deflector portion 34, which in the instance of the upper heat transfer member 26, Figure 2, extends angularly outwardly toward the warm air outlet openings 25 of the enclosure.

The heat transfer members 26 are connected to opposite sides of the conduit 11 in vertically aligned relation by means of securing elements 35. A metal band 36 extends through the openings 30 at each end of the fin 27. The band encircles the conduit 11, and the walls 29 of the heat transfer members 26. A U-shaped clip 37 includes openings 38 and 39. The openings 38 include a serrated surface as best shown in Figure 3. A locking pin 40 is provided with a hexagonal head 41 and includes a body having a serrated portion 42 and a slotted portion 43.

During use of this improved convection type heat radiating device, the conduit 11 generally extends around the four walls of a room. The baseboard enclosure is made up of a plurality of sections, from any one of which the cover plate 22 may be readily removed. In order to secure an efficient heat radiation the heat transfer members may be suitably spaced at regular intervals along the conduit. Additional heat transfer members may be added at any point by simply removing the cover plate 22 and thereupon securing said members to the conduit in heat transfer relation.

The locking pin 40 is pushed into the openings 38 and 39. The ends of the metal band are passed through the slotted portion 42 and by turning the locking pin 40, the band is tightened thereby rigidly securing the heat transfer members to the conduit 11, in vertically aligned relation.

The serrated portion 42 engages the serrations of the openings 38 in a manner preventing loosening of the pin 40.

The general travel of the convection currents is best shown by the arrows in Figure 2. The unheated air enters through the openings 24 whereupon it enters the openings 31 of the lower heat transfer members 26. The louvers 33 guide the air upwardly against the hot surface of the fins and the transverse walls 29, and thereupon outwardly through the openings 30 of the lower heat transfer member 26. The air now passes around portions of the conduit and enters in a circuitous manner through the openings 30 of the upper heat transfer member 26. The air which has now been heated by the heat exchange process is deflected outwardly by means of the deflectors 34, through the openings 25 to the room.

With the use of applicant's novel type of radiating device, uniform heat within a room can be provided by simply adding or removing heat transfer members. In this manner of heating there are no cold or hot portions in a room but the heat is well diffused and uniform. Convection currents provide for gentle even heating and a constant temperature can be obtained.

With the novel attaching means shown, the heat transfer members may be added or removed without disconnecting any portions of the conduit, or if desired without shutting of the heating system.

It can now be readily seen and understood that applicant has provided a novel improvement in a convention type heat radiator and it must be understood that modifications and alterations may be made in this construction which do not depart from the spirit of the invention as disclosed nor the scope thereof as defined in the appended claims.

What is claimed is:

1. In a heat transfer structure for increasing the rate of dissipation from a horizontal conduit for conducting a heated fluid; a pair of heat transfer members, each heat transfer member including a plurality of transversely spaced vertical fins; said fins having a plurality of horizontally extending first and second openings; an arcuate wall connecting the ends of the fins adjacent to the second openings, said wall being transversely arched for adapting it to embrace a portion of the conduit in heat transfer relation; inwardly extending louver members associated with said first openings; outwardly extending louver members associated with the second openings; securing means for connecting said pair of heat transfer members to opposite sides of the conduit in substantially vertically aligned relation; and an enclosure over said heat transfer members, said enclosure having air intake openings adjacent to the lower end of one heat transfer member and air outlet openings adjacent to the upper end of the other heat transfer member.

2. In a heat transfer structure for increasing the rate of heat dissipation from a conduit for conducting a heated fluid; a pair of heat transfer members, each heat transfer member including a pair of radiator fins in opposed laterally-spaced substantially vertical and parallel relation, said fins having horizontally extending air openings; a base member connecting said fins along an edge thereof, said base member being transversely arched for adapting it to embrace the conduit in heat transfer relation; securing means for connecting said heat transfer members to opposite surfaces of the conduit in substantially vertically aligned relation; a metal baseboard enclosure for said heat transfer members, said baseboard enclosure having air intake and air outlet openings; and a deflector portion at the edge of each fin opposite to that connecting with the base member, said deflector portion extending angularly with respect to said fin for deflecting convection currents of heated air outwardly through the air outlet openings of said baseboard enclosure.

3. In a heat transfer structure for increasing the rate of heat dissipation from a heating conduit; a heat conductor plate including an elongated intermediate section for resting a face thereof on such conduit while arranged lengthwise thereof, fin-like sections bent outwardly from the opposite face of the intermediate section along respective opposite longitudinal edges thereof, openings in the fin-like plates to facilitate the transfer of air between opposite sides of such fins, and louvers comprising portions of said fin-like sections and projecting over said openings in a direction transversely of the intermediate elongated section.

4. The combination set forth in claim 3, wherein said elongated intermediate section is transversely arched for adapting the first named face thereof to conform to a cylindrical heating conduit.

5. In a heat transfer structure for increasing the rate of heat dissipation from a heating conduit; a heat conductor plate including an elongated intermediate section for resting a face thereof on such conduit while arranged lengthwise thereof, fin-like sections bent outwardly from the opposite face of the intermediate section along respective opposite longitudinal edges thereof to place inner faces of such fins in opposed spaced-apart relation, openings in such fins, louvers respectively associated with such openings and projecting over such openings to present free edges thereof generally toward said intermediate section of the plate.

6. The combination set forth in claim 5 wherein part of the louvers are on the inner opposed faces of the fins and part are on the outer faces thereof.

7. The combination set forth in claim 5, wherein some of the openings are closer to the intermediate plate section than others, and wherein the louvers associated with the closer openings are on the outer faces of the fins and those associated with openings more distantly from the intermediate plate section are on the inner faces of the fins.

8. The combination set forth in claim 5 wherein free edge portions of the fins oppositely from their edges at the intermediate plate section are bent laterally in the same direction to effect an air conducting passage therebetween.

LE ROY N. HERMANN.

REFERENCES CITED

The following references are of record in the file of this patent:

UNITED STATES PATENTS

| Number | Name | Date |
|---|---|---|
| 1,956,617 | Jaffe | May 1, 1934 |
| 1,957,702 | Davis, Jr., et al. | May 8, 1934 |
| 2,063,736 | Hardiman et al. | Dec. 8, 1936 |
| 2,063,757 | Saunders | Dec. 8, 1936 |
| 2,355,621 | Brown, Jr. | Aug. 15, 1944 |